United States Patent

Gideon

(10) Patent No.: US 6,944,644 B2
(45) Date of Patent: Sep. 13, 2005

(54) EVENT MANAGEMENT IN A SYSTEM WITH SEPARATE APPLICATION AND GRAPHICAL USER INTERFACE PROCESSING

(75) Inventor: Carl A. Gideon, Wylie, TX (US)

(73) Assignee: Emrys Technologies, Ltd., Richardson, TX (US)

( * ) Notice: Subject to any disclaimer, the term of this patent is extended or adjusted under 35 U.S.C. 154(b) by 323 days.

(21) Appl. No.: 10/055,552

(22) Filed: Jan. 23, 2002

(65) Prior Publication Data

US 2002/0069246 A1 Jun. 6, 2002

Related U.S. Application Data

(63) Continuation of application No. 09/164,244, filed on Sep. 30, 1998.

(51) Int. Cl.$^7$ .............................................. G06F 15/16
(52) U.S. Cl. ...................................... 709/203; 709/201
(58) Field of Search ................................ 709/217, 218, 709/219, 203, 202; 718/101; 707/204, 101; 345/806, 762; 705/35; 715/507; 719/314; 712/225; 703/203, 201

(56) References Cited

U.S. PATENT DOCUMENTS

| | | | | |
|---|---|---|---|---|
| 5,187,787 A | * | 2/1993 | Skeen et al. ................ 719/314 |
| 5,278,984 A | | 1/1994 | Batchelor ................... 709/207 |
| 5,341,477 A | | 8/1994 | Pitkin et al. ................ 709/226 |
| 5,410,704 A | * | 4/1995 | Norden-Paul et al. ...... 718/101 |
| 5,557,798 A | * | 9/1996 | Skeen et al. ................... 705/35 |
| 5,602,998 A | * | 2/1997 | Alferness et al. ........... 712/225 |
| 5,613,106 A | * | 3/1997 | Thurman et al. ........... 707/204 |
| 5,640,577 A | * | 6/1997 | Scharmer ..................... 715/507 |
| 5,644,720 A | | 7/1997 | Boll et al. ................... 709/227 |
| 5,649,190 A | * | 7/1997 | Sharif-Askary et al. .... 707/101 |
| 5,712,993 A | * | 1/1998 | Ichikawa ..................... 345/762 |
| 5,900,870 A | * | 5/1999 | Malone et al. .............. 345/866 |
| 6,125,383 A | * | 9/2000 | Glynias et al. ............. 709/202 |
| 6,377,973 B2 | * | 4/2002 | Gideon ....................... 709/203 |

* cited by examiner

Primary Examiner—Le Hien Luu
(74) Attorney, Agent, or Firm—Baker Botts L.L.P.

(57) ABSTRACT

A network-based system is provided in which application logic and business rules reside on a server to which a user attaches from a client machine. The system includes a view manager residing on the client machine for generating a graphical user interface (GUI) environment for the user. An application engine resides on the server for controlling the view manager. Events in an event queue at the client machine are parsed to determine which events require application processing. Events requiring application processing are sent to the server and other events are left in the event queue. The system also maintains stack synchronization between the client machine and the server.

16 Claims, 3 Drawing Sheets

EVENT MANAGEMENT IN A SYSTEM WITH SEPARATE APPLICATION AND GRAPHICAL USER INTERFACE PROCESSING

This application is a continuation of U.S. patent application, Ser. No. 09/164,244, filed Sep. 30, 1998 entitled: "Event Management in a System with Application and Graphical User Interface Processing Adapted to Display Predefined Graphical Elements Resides Separately on Server and Client Machine," and is incorporated herein by reference in its entirety.

BACKGROUND OF THE INVENTION

1. Technical Field

The present invention relates generally to client-server processing and, more particularly, to an application environment wherein application logic and business rules reside on a server to which users attach from client machines that have independent graphical user interface (GUI) processing.

2. Description of the Related Art

The computer industry has changed dramatically over the past few years and that, coupled with the explosive growth of the Internet, has changed the way people interact with and access information. The growth of the Graphical User Interface (GUI) and the World Wide Web, the graphical side of the Internet, has changed users' expectations of how they interact with information.

These changes present new challenges in data processing. While data processing has traditionally been performed internally, e.g., within a company site, the new global information access infrastructure allows remote data processing.

Current remote control systems that can be adapted for remote data processing such as PCAnywhere or Citrix Servers have two significant drawbacks. First, their system overhead requirements keep them from being scaled to a large number of users. Second, keyboard interaction takes place essentially on a character-by-character basis. In tests of remote control systems, and character-based systems such as Unix telnet, the character-by-character method was found unacceptable over the Internet for sustained usage of the program. With delay times typically of ¼ to ½ of a second, and sometimes more, it becomes very difficult for data entry personnel to develop any rhythm that allows for high-speed entry. Using ActiveX controls and other methods based on standard Remote Procedure Call (RPC) implementations requires too much bandwidth to perform acceptably over limited speed connections such as a 28.8 kbps connection. Moreover, additional installation is needed on the client side. Web browser based implementations do not have interactive field-by-field validation, lookups, or help needed for large-scale applications. In addition, they do not allow multiple overlapping windows.

Some operating systems (such as the Windows operating system) use an event queue to process and sequence events (such as key strokes, mouse clicks, etc.). Generally, events such as keystrokes are simply delivered to the window that is currently active. This, however, becomes somewhat complicated if a keystroke is able to activate another window. As fast users often type ahead, there is no assurance that keystrokes will be sent to the intended window.

BRIEF SUMMARY OF THE INVENTION

A primary object of the present invention is to provide a network-based system that allows for high-speed data entry at a remote client.

A further object of the invention is to provide a network-based system for remote data processing in which substantially all application logic and business rules reside on a common server, and GUI processing is performed separately at a client machine.

A further object of the invention is to provide a network-based system providing a sophisticated user interface at a client machine controlled by a server using a low bandwidth connection (such as a 28.8 kbps modem connection) and minimal client resources.

Another object of the invention is to provide a network-based system for remote data processing that is scaleable to a large number, e.g., hundreds, of concurrent users.

These and other objectives are accomplished by a network-based system in which application logic and business rules reside on a server to which a user attaches from a client machine. The system includes a view manager residing on the client machine for generating a graphical user interface (GUI) environment for the user. An application engine resides on the server for controlling the view manager. Events in an event queue at the client machine are parsed to determine which events require application processing. Events requiring application processing are sent to the server and other events are left in the event queue. The system also maintains stack synchronization between the client machine and the server.

The inventive system allows remote high-speed data entry while maintaining keystroke synchronization. The system is scaleable to a large number, e.g., hundreds, of concurrent users. It provides a sophisticated user interface at the client machine controlled by the server using a low bandwidth connection (such as a 28.8 kbps modem connection) and minimal client resources.

The foregoing has outlined some of the more pertinent objects and features of the present invention. These objects should be construed to be merely illustrative of some of the more prominent features and applications of the invention. Applying the disclosed invention in a different manner can attain many other beneficial results or modifying the invention as will be described.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
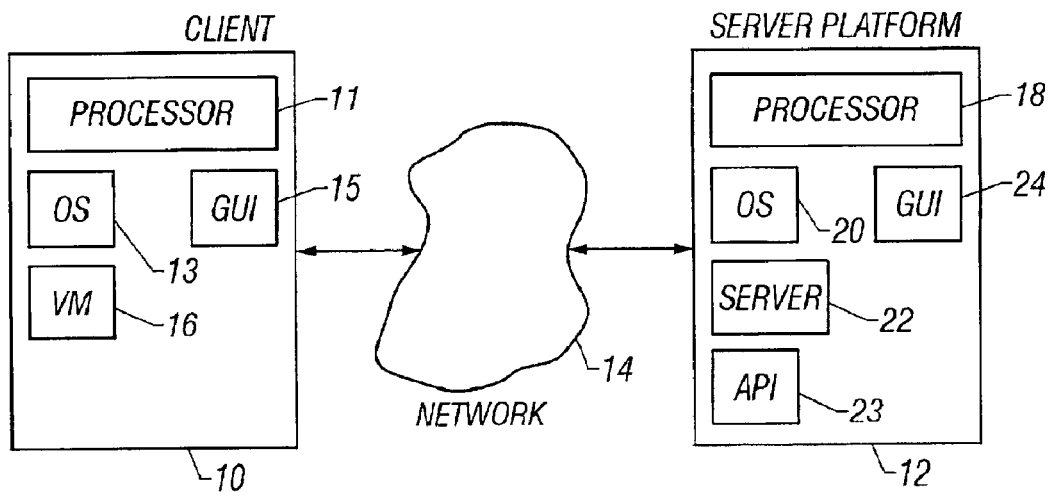
FIG. 1 shows an illustrative network environment in which the inventive system is implemented.

Embodiments of the present invention are illustrated in the FIGUREs, like numerals being used to refer to like and corresponding parts of the various drawings. A representative client-server network environment in which the present invention can be implemented is illustrated in FIG. 1. A client machine 10 is connected to an application server platform 12 via network 14. The network 14 can be the Internet, an Intranet or other network connection. It preferably comprises the Internet's World Wide Web, making information accessible remotely using view manager software. Application server platform 12 is one of a plurality of servers that are accessible by the clients, one of which is illustrated by the machine 10.

The client machine 10 includes a processor 11, an operating system 13, a graphical user interface 15, and a View Manager 16.

A representative application server platform 12 comprises a processor 18 such as, e.g., an IBM RISC System/6000 computer (a reduced instruction set or so-called RISC-based workstation) running an Operating System 20 such as, e.g., the Windows NT Operating System. The platform 12 also includes an application server program 22. The platform 12 also preferably includes a graphical user interface (GUI) 24 for management and administration. In addition, the application server 22 includes an Application Programming Interface (API) 23 that provides extensions enabling application developers to extend and/or customize the core functionality.

A representative client is a personal computer (PC) workstation that is x86-, PowerPC®- or RISC-based, that includes an operating system such as Microsoft Windows 3.1 and Windows 95 (or higher), and that includes the View Manager 16.

Briefly, in accordance with the invention, substantially all application logic and business rules reside on the common Windows NT server 12. The client 10 preferably comprises a so-called thin client (with minimal client resources) having full Graphical User Interface (GUI) functionality, but containing substantially no application level intelligence. The thin client 10 is capable of performing well using a 28.8 modem connection through the Internet. The inventive system is scaleable to large numbers, e.g., hundreds of concurrent users.

In the inventive system, the normal Windows components are separated into two distinct objects: the data model (which contains substantially all of the information about an object such as color, size, font, position, etc.) and the View Manager (which uses information from the data model to construct an actual GUI element). The data model resides on the server, and the View Manager resides on the client machine. The system includes a message passing architecture that allows the data model and the View Manager to communicate with each other. The View Manager uses information from the data model (obtained from a message) to construct a GUI element, and then sends messages to the data model if the user changes any of the view characteristics. These messages can be sent locally or over any TCP/IP connection.

Figure 2:
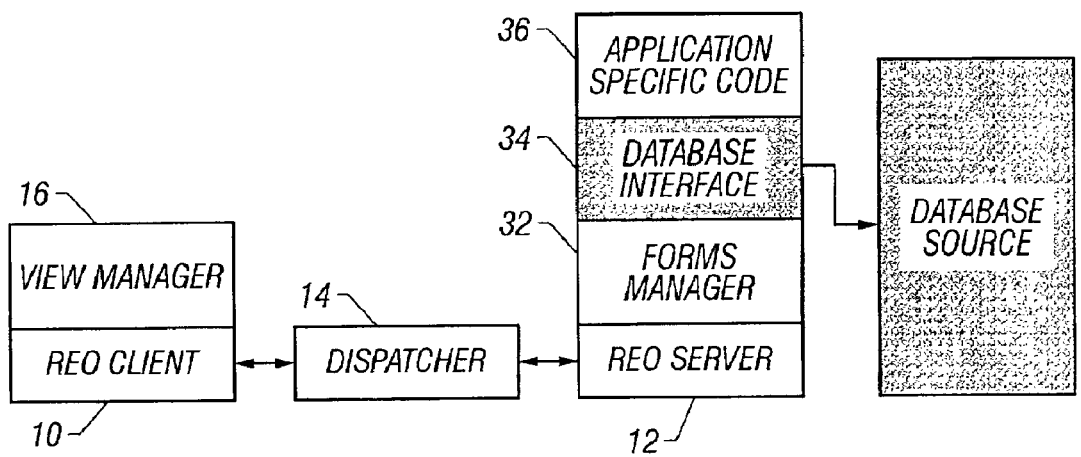
FIG. 2 is a simplified block diagram of the system.

FIG. 2 is a simplified block diagram illustrating system components in greater detail. The underlying architecture is based on an n-tier paradigm using a message passing IPC (InterProcess Communications) protocol. Each tier in the system is composed of one or more processes referred to as Managers. On the client side, the View Manager 16 is responsible for rendering graphical elements, interfacing with the user, and forwarding events to the server 12. On the server side, the Forms Manager 32 (using the data model) provides the control structures that manage the View Manager objects, respond to events, and interface with the application layer to provide program flow control. While the Forms Manager 32 controls the GUI elements on the View Manager 16, it preferably has no actual GUI elements itself.

At its lowest level, the system is composed of three basic components: a remote object client 10, a remote object server 12, and a dispatcher 14. The objects communicate with each other by sending messages. A message is a packet of bytes passed from one object to another. There is no predefined structure to a message except that defined by the sending and receiving objects. The dispatcher preferably uses a simple message passing structure based on the Winsock/Berkeley sockets TCP/IP interface to communicate between objects. Parameters are placed directly into a message buffer. The message is sent via the dispatcher to the remote system using standard TCP/IP socket calls. It is then passed to the target object. The arguments are removed from the message and the appropriate code is called to perform the function. A flag indicates if a response is required to the message. Not only does this approach simplify the steps needed to build the application, but it gives us complete control over the underlying communications parameters and requires no specialized software to be installed on the client or the server.

The client and server components at this lowest level are responsible for routing a message received from the dispatcher to the appropriate object. The View Manager 16 implements only the client component preferably using Windows Asynchronous Sockets to allow it to run in the Windows 3.1 and Windows 95 environments. The server software implements both the server and the client components in a multi-threaded environment preferably using a standard Berkeley sockets style interface. By implementing both server and client components, the server process can function as both a server for the View Manager 16, and as a client to other processes. This provides the foundation for the n-tier architecture.

The Forms Management layer allows GUI elements to be created and controlled by the server 12 on a remote client 10. Using the messaging system to create and manage remote objects, the server can control sophisticated user interfaces using a low bandwidth connection and minimal client resources.

Layered on top of the Forms Manager 32 is a Database Manager 34 designed to provide relational database access to information, and Application Specific Code 36 that provides the business rules and program control logic. Both of these layers execute in the multi-threaded server process and have full access to the communications layer. This provides the core functionality of the system. The View Manager 16 is a relatively small, simple Windows application that requires virtually no specialized client software aside from a standard TCP/IP interface. The server components provide all application control logic and business rules. Together they form a very powerful framework to provide sophisticated GUI applications that can run over low bandwidth communication links.

Thus, the View Manager 30, which resides on the client workstation 10, provides a full GUI environment and communicates with the Forms Manager 32 through a message architecture. It is responsible for all user input processing and output rendering. As will be described in greater detail below, through the use of intelligent event masks, only those events that require application processing are ever sent back to the server. This puts all of the user interface workload at its most appropriate location, the user's machine. It allows the server components to process data in a bulk transaction oriented fashion rather than a highly interactive event driven method.

As previously discussed, the Windows operating system uses an event queue to process and sequence events (such as key strokes, mouse clicks, etc.). Usually events, such as keystrokes are delivered to a window currently in focus. However, the process becomes somewhat complicated if a keystroke causes another window to become active. As fast users often type ahead, it is critical that the proper keystrokes get sent to the intended window.

Figure 3:
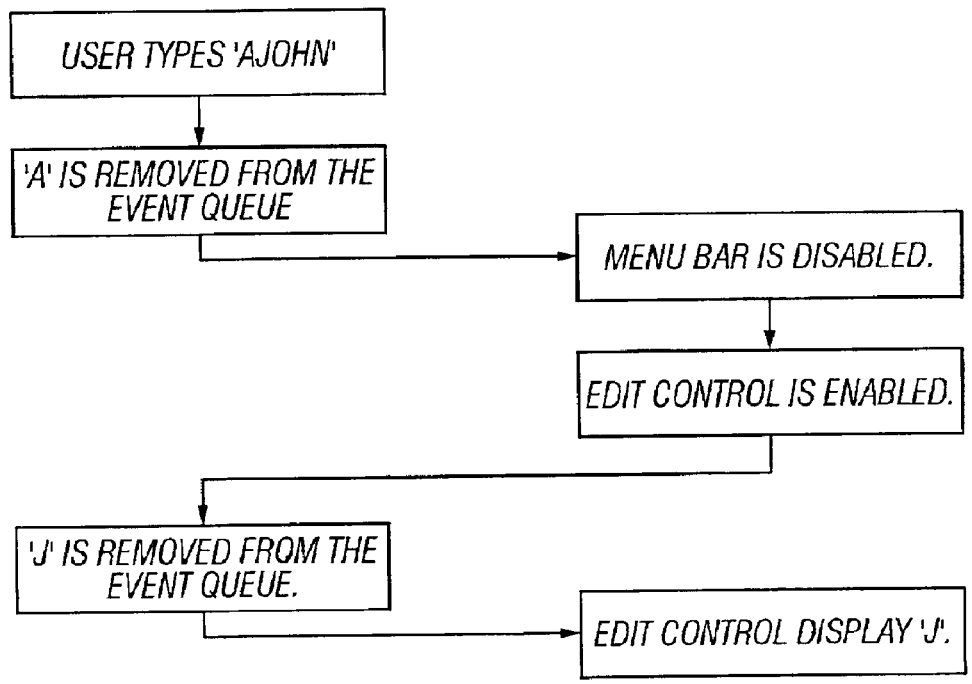
FIG. 3 is a block diagram illustrating idealized keystroke processing.

FIG. 3 shows idealized keystroke processing. For example, if a user is positioned on a menu bar and presses an 'A', a new record is added. Also, the menu bar is disabled, and the first edit control becomes active. If the user types 'AJohn' rapidly, the 'A' disables the menu and activates the edit control. However, it is important that the 'J' not be removed from the event queue until the edit control has focus. If it were removed between the time the menu was disabled and the edit control was activated, it would be lost since it would be sent to the now disabled menu bar.

Figure 4:
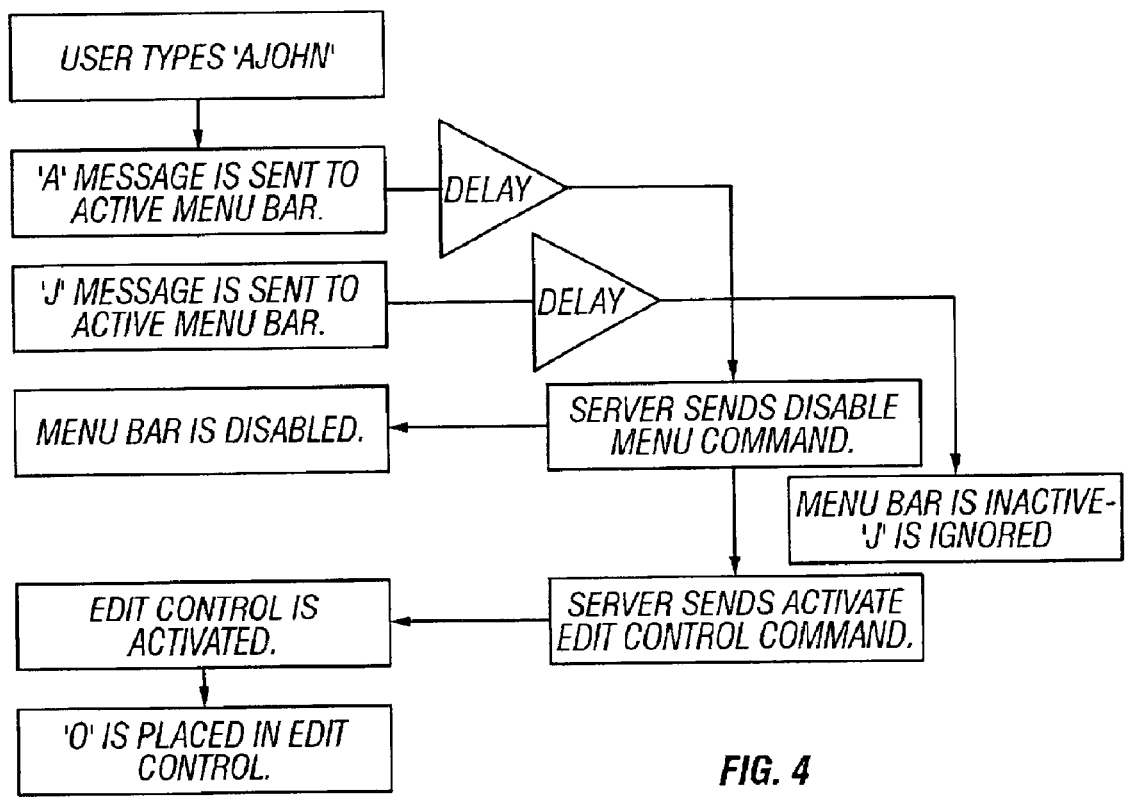
FIG. 4 is a block diagram illustrating the effects of network delay in keystroke processing.

As shown in FIG. 4, keystrokes can become lost as a result of network delay. When the user (positioned on a menu bar) types 'AJohn' rapidly, the 'A' is sent to the active menu bar. There is however network delay before the server processes the event and disables the menu command. Because of the delay, the 'J' keystroke is sent to the still active menu bar. There is also a delay before the 'J' stroke is processed by the server. By the time the 'J' stroke is processed, the menu bar has been disabled (by the 'A' keystroke), and the 'J' keystroke is therefore ignored.

After the server disables the menu bar, it activates the edit control command. By this time, the 'o' keystroke is processed and is placed first in edit control instead of 'J' as intended.

Figure 5:
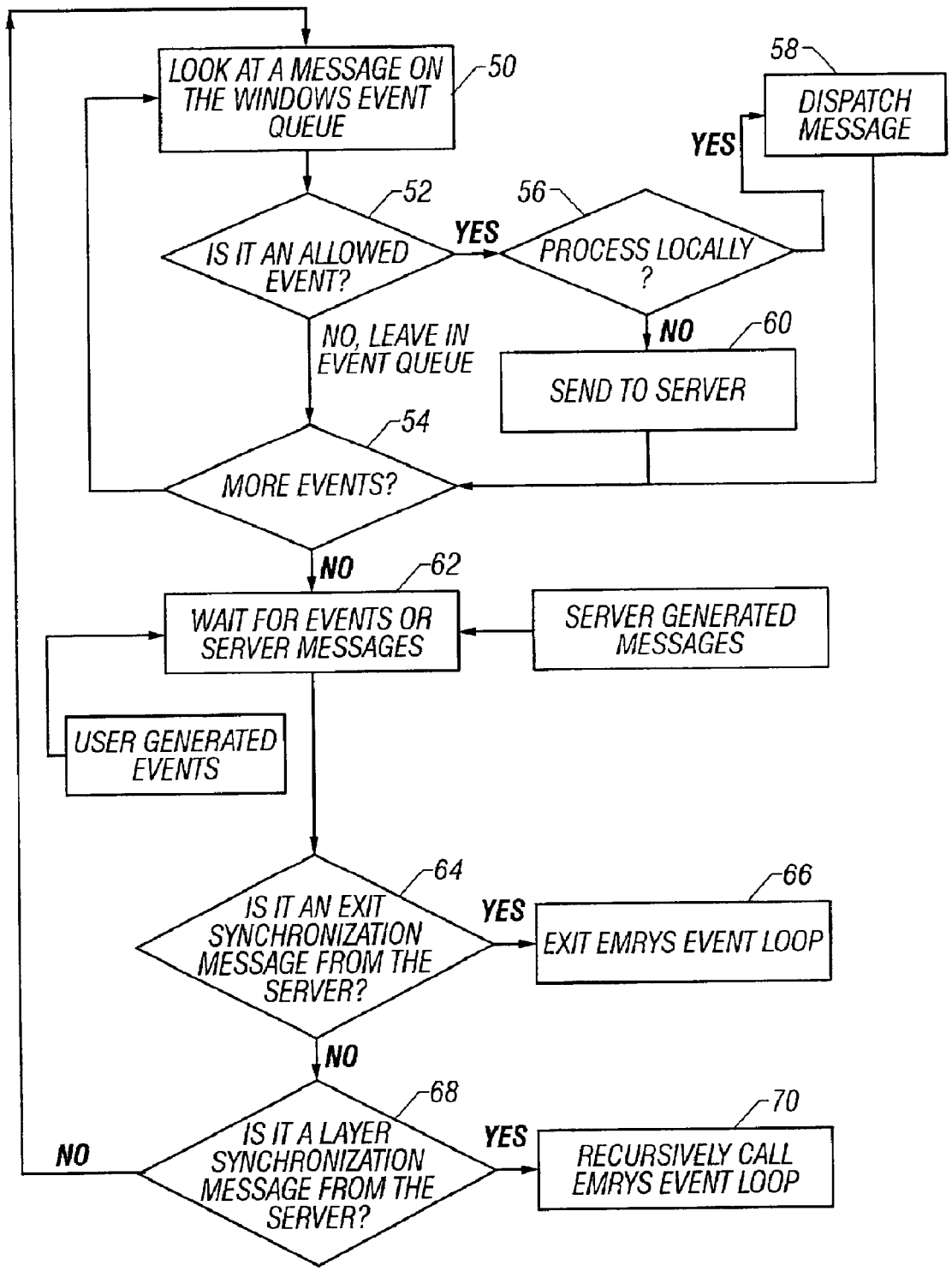
FIG. 5 is a flow chart illustrating the event loop system in accordance with the present invention.

To avoid this problem, an inventive event loop system is provided as shown in FIG. 5. In brief, the event loop scans the Windows event queue and only removes messages that are allowed based on an event mask. The event loop also responds to special synchronization messages to recursively call and exit the event loop to maintain stack synchronization between the View Manager and server.

At Step 50 the system looks for a message on the event queue. A determination is made at Step 52 whether the event is an allowed event. If not, then at Step 54 the system determines whether there are any more events. If there are more events, the process returns to Step 50.

If at Step 52 it is found that the event is an allowed event, then at Step 56 a determination is made whether it should be processed locally. If so, a message is dispatched at Step 58 and the process moves to Step 54. If the event is not to be processed locally, it is sent to the server at Step 60, and the process moves to Step 54.

If at Step 54, a determination is made that there are no more events, then the system waits at Step 62 for user generated events or server generated events. Thereafter at Step 64, a determination is made whether an exit synchronization message has been received. If so, the process exits the event loop at 66. If not, then at Step 68, a determination is made whether the message is a layer synchronization message from the server. If so, the process recursively calls the event loop at Step 70. If not, the process returns to Step 50.

The inventive system allows remote high-speed data entry while maintaining keystroke synchronization. The system is scaleable to a large number, e.g., hundreds, of concurrent users. It provides a sophisticated user interface at the client machine controlled by the server using a low bandwidth connection (such as a 28.8 kbps modem connection) and minimal client resources.

Although the present invention has been described in detail, it should be understood that various changes, substitutions and alterations can be made hereto without departing from the spirit and scope of the invention as described by the appended claims.

What is claimed is:

1. A client machine for remotely executing application functionality, the client machine communicatively coupled to a server, a forms manager residing on the server, the client machine comprising:

a view manager, the view manager operable for generating a graphical user interface environment, the graphical user interface environment comprising graphical objects, the view manager manipulating the graphical objects in response to communication from the forms manager;

instructions for characterizing events at the client machine as either requiring processing by the application server or processing by the view manager;

instructions for parsing events in an event queue at the client machine to determine when and in what order to process the events; and instructions for extracting events that require processing by the application engine and sending the events that require processing by the application engine to the server.

2. The client machine of claim 1, the client machine further comprising:

instructions for maintaining stack synchronization between the client machine and the server.

3. The client machine of claim 1 wherein the graphical objects comprise predefined graphical elements.

4. The client machine of claim 1 wherein the forms manager maintains data objects on the server, the data objects being associated with the graphical objects on the client machine.

5. The client machine of claim 1 wherein the client machine is communicatively coupled to the server through a global network.

6. The client machine of claim 1 wherein the client machine is communicatively coupled to the server through a network using TCP/IP.

7. The client machine of claim 1 wherein the client machine is communicatively coupled to the server through a dispatcher.

8. The client machine of claim 1 wherein the client machine is communicatively coupled to the server through a wireless network.

9. A server, the server communicatively coupled to at least one client machine, the server comprising:

a forms manager, the forms manager operable to direct a view manager residing on the at least one client machine to render a graphical object, the at least one client machine containing instructions for characterizing events at the client machine as either requiring processing by the server or processing by the view manager, and at least one data object, the forms manager storing data associated with the graphical data object in the at least one data object; and an application logic accessible by the forms manager, the forms manager applying the application logic to a message sent by the view manager associated with an event from an event queue residing on the at least one client machine, the event being characterized by the at least one client machine as requiring processing by the server.

10. The server of claim 9, the server further comprising:
an application-programming interface, the application programming interface operable to permit access to the core functionality of the forms manager.

11. The server of claim 9, the server further comprising:
a database interface accessible to the forms manager.

12. The server of claim 11, the server further comprising:
a database accessible to the forms manager through the database interface.

13. The server of claim 9 wherein the server is communicatively coupled to the at least one client machine through a global network.

14. The server of claim 9 wherein the server is communicatively coupled to the at least one client machine through a dispatcher.

15. The server of claim 9 wherein the server is communicatively coupled to the at least one client machine through a network using TCP/IP.

16. The server of claim 9 wherein the server is communicatively coupled to the at least one client machine through a wireless network.

* * * * *